United States Patent [19]

McHenry et al.

[11] Patent Number: 5,592,533
[45] Date of Patent: Jan. 7, 1997

[54] PERSONAL COMMUNICATION SERVICE REGISTRATION SYSTEM AND METHOD

[75] Inventors: James F. McHenry, Doylestown, Pa.; Robert D. Farris, Sterling, Va.

[73] Assignee: Bell Atlantic Mobile Systems, Inc., Bedminster, N.J.

[21] Appl. No.: 363,035

[22] Filed: Dec. 23, 1994

Related U.S. Application Data

[63] Continuation-in-part of Ser. No. 363,040, Dec. 23, 1994.

[51] Int. Cl.[6] .................................................. H04Q 7/24
[52] U.S. Cl. ............................ 379/58; 379/60; 455/33.2
[58] Field of Search .................................. 379/58, 59, 60; 455/33.1, 33.2, 56.1, 54.1

[56] References Cited

U.S. PATENT DOCUMENTS

| | | |
|---|---|---|
| 4,191,860 | 3/1980 | Weber . |
| 4,313,035 | 1/1982 | Jordan et al. . |
| 4,611,094 | 9/1986 | Asmuth et al. . |
| 4,611,096 | 9/1986 | Asmuth et al. . |
| 4,756,020 | 7/1988 | Fodale . |
| 4,757,267 | 7/1988 | Riskin . |
| 4,788,718 | 11/1988 | McNabb et al. . |
| 4,899,373 | 2/1990 | Lee et al. . |
| 5,054,055 | 10/1991 | Hanle et al. . |
| 5,060,255 | 10/1991 | Brown . |
| 5,155,860 | 10/1992 | McClure . |
| 5,197,092 | 3/1993 | Bamburak . |
| 5,251,248 | 10/1993 | Tokunaga et al. . |
| 5,313,636 | 5/1994 | Noble et al. . |
| 5,329,578 | 7/1994 | Brennan et al. . |
| 5,353,331 | 10/1994 | Emery et al. . |

*Primary Examiner*—Curtis Kuntz
*Assistant Examiner*—Nay Aung Maung
*Attorney, Agent, or Firm*—Lowe, Price, LeBlanc & Becker

[57] ABSTRACT

A system and method is provided for effecting registration in a system for routing a call to a subscriber to a personal telephone number service in an integrated wired and wireless communication network by utilizing in association with at least one land line terminal located in a public gathering place such as a restaurant an adjunct registration device which cooperates with portable registration devices capable of being identified by such adjunct registration devices. In a manual version an adjunct registration device is situated at the site of the subscriber premise terminal and registration in the ISCP of the advanced intelligent network (AIN) of the wireline system is effected by subscriber actuation of the manual device. In an automated version the registration device at the site of the terminal includes a transceiver for emitting a periodic low power and limited range scanning signal to detect the presence of a smart portable registration device carried by the subscriber.

26 Claims, 5 Drawing Sheets

PERSONAL COMMUNICATION SERVICE REGISTRATION SYSTEM AND METHOD

RELATED APPLICATIONS

This application is a continuation-in-part of commonly assigned application Ser. No. 08/363,040 filed on Dec. 23, 1994 (680-098).

TECHNICAL FIELD

This invention relates to personal communications service (PCS) and more particularly to systems and methods for effecting registration of a subscriber at multiple locations to enable communication with the subscriber by dialing a single personal telephone number.

Acronyms

The written description uses a large number of acronyms to refer to various services and system components. Although known, use of several of these acronyms is not strictly standardized in the art. For purposes of this discussion, acronyms therefore will be defined as follows:

- Action Control Point (ACP)
- Advanced Intelligent Network (AIN)
- Base Station (BS)
- Cellular Subscriber Station (CSS)
- Central Office
- Common Channel Inter-office Signaling (CCIS)
- Customer/Dealer Service Company (CDSC)
- Dual Tone Multifrequency (DTMF)
- Data and Reporting System (DRS)
- Directory Number (DN)
- End Office (EO)
- Equipment Identity Register (EIR)
- Home Location Register (HLR)
- Integrated Service Control Point (ISCP)
- Mobile Identification Number (MIN)
- Mobility Controller (MC)
- Mobile Switching Center (MSC)
- Mobile Telephone Switching Office (MTSO)
- Personal Communication Service (PCS)
- Plain Old Telephone Service (POTS.)
- Qualification Request (QUALREQ)
- Registration Cancellation (REGCANC)
- Registration Notification (REGNOT)
- Service Control Point (SCP)
- Service Management System (SMS)
- Service Profile Request (PROFREQ)
- Service Switching Point (SSP)
- Single Directory Number Service (SDNS)
- Signaling Transfer Point (STP)
- Service Creation Environment (SCE)
- Telephone Company (TELCO)
- Temporary Local Directory Number (TLDN)
- Transaction Capabilities Applications Protocol (TCAP)
- Visitor Location Register (VLR)

BACKGROUND ART

As described further hereinafter, the patent literature has recognized a need for telephone service in which subscribers are provided with a single personal telephone number which may be used to communicate with those subscribers regardless of their physical locations. For example, callers to a personal number may automatically be connected to a business, residence, cellular or other phone, or voice messaging system, depending on the circumstances of the personal number subscriber at the time of the call. Such service is herein referred to as Single Directory Number Service (SDNS).

U.S. Pat. No. 5,315,636, issued May 24, 1994, to Rajendra Patel, describes a proposed single personal telephone directory number system. That patent describes a system utilizing the existing public and cellular communications systems to provide single directory number service by adding a radio tracking system and dedicated service node linked by DID/DOD trunks and Feature Group B/D trunks to the public switched telephone network, through which access is obtained to the local existing cellular network. The personal communicator carried by each subscriber is not utilized for voice communication but rather is more like a pager which can receive and display information dispatched by a central transmitter. It contains a microprocessor and a number of function and numeric keys. The function keys cause the communicator to transmit commands to direct special call handling such as "hold", "do not disturb", "take a message", "transfer", etc. The number keys may be utilized to indicate the directory number to which the call is to be delivered. The commands transmitted by the communicator are passed through the separate radio messaging system to the dedicated service node.

There is available today in the leading public switched telephone networks an Advanced Intelligent Network (AIN) which provides centralized control of telephone services provided to subscribers through diversely located central office switching systems. In an AIN type system, central offices send and receive data messages from an Intelligent Services Control Point (ISCP) via a Switching Transfer Point (STP). At least some calls are then controlled through multiple central office switches using data retrieved from a database in the ISCP. In recent years, a number of new service features have been provided by the Advanced Intelligent Network (AIN).

U.S. Pat. No. 4,756,020 issued Jul. 5, 1988, to Joseph V. Fodale, for example, suggests access authorization in a multiple office environment. The Fodale system restricts access to a long distance telephone network based on the status of the billing number associated with the call, i.e., delinquent. The access control is provided through multiple local and toll offices but is centrally controlled by a database which stores account status information. The local office serving a calling telephone extends a toll call to the toll office of the toll network carrier. The toll office queries the database via a CCIS link regarding the current status of the customer's account identified by the billing number associated with the call. The database obtains the status information of the billing number in question and translates that status into a response message instruction to allow or disallow extension of the toll call through the toll network. The database transmits the response message to the tbll office via CCIS link, and the toll office disallows or extends the call through the toll network as instructed by the response message.

A number of the features provided by the prior art AIN type intelligent networks relate to specialized call processing of incoming calls, as discussed below.

U.S. Pat. No. 4,191,860 issued Mar. 4, 1980, to Roy P. Weber discloses a system for providing special processing of incoming calls via a number of local switching offices based on information stored in a central database. The local and toll offices of the telephone network compile a call data message and forward that message via a CCIS link to the central database, essentially a Service Control Point or SCP. The database at the SCP translates the dialed INWATS number, included in the message, into a call control message. The call control message includes an unlisted destination telephone number, which is then returned to the offices of the network via CCIS link. The network uses the call control message to complete the particular call.

U.S. Pat. Nos. 4,611,094 and 4,611,096 both to Asmuth et al. disclose a system for providing custom incoming telephone call processing services to a corporate customer operating at geographically dispersed locations through a plurality of local office switches. A customer program stored in a central database is accessed to provide instructions to the switches to complete incoming calls to customer locations in accord with special services defined by the corporate customer. Incoming calls to the customer are routed to an Action Control Point (ACP) which typically is a modified toll office. The ACP has a number of "primitive" call processing capabilities, such as providing voice prompts to callers and receiving additional caller inputs. The customer program controls the ACP's to string together the desired primitive call processing capabilities to process each call to the customer. Specified parameters stored in the program, such as time of day, caller location and data inputs responsive to the voice prompts, determine the final customer station to which each call should be completed. The customized call processing disclosed by Asmuth et al. can also include customized billing for calls, e.g., by splitting charges between the customer and the caller. The Asmuth et al. system sets up a billing record for each call in the ACP or toll office. Asmuth et al. also teach procedures for handling of calls directed to a corporate customer when the call serving office does not have all of the capabilities needed for processing the call in accord with the customer's stored program. In particular, upon recognition of the deficiencies of the call serving office, the Asmuth et al. system transfers call processing to a second office having adequate capabilities for completion of the call.

U.S. Pat. No. 4,788,718 issued Nov. 29, 1988, to Sandra D. McNabb et al. suggests centralized recording of call traffic information. The architecture is similar to that disclosed by the earlier discussed patents to Weber and Asmuth et al. to the extent that local and toll offices communicate with a central database via CCIS link. The McNabb et al. system improves over the incoming call routing provided by the Weber patent and the two Asmuth et al. patents discussed above by adding a data gathering function to the centralized database which stores the individual customer's call routing program. In McNabb et al. the central data processor provides call attempt records and a traffic data summary of all calls directed to a particular 800 number.

U.S. Pat. No. 4,757,267 issued Jul. 12, 1988, to Bernard J. Riskin teaches routing of an 800 number call, where the dialed number identifies a particular product or service, to the nearest dealer for the identified product or service. The toll office sends a message including the dialed 800 number and the area code of the caller to a database which translates this into a standard ten digit telephone number for the nearest computer at a Customer/Dealer Service Company (CDSC). The telephone network then routes the call to this computer, which answers the call and provides a synthesized voice response. The computer uses call data and or touch tone dialed information from the caller to identify the selected product or service and then accesses its own database to find the telephone number of one or more nearby dealers in that product or service. The computer then calls the dealer and connects the original caller to the called dealer.

Several other patents use a network similar to the AIN type intelligent network to provide personalized services to individual subscribers, for example when they are away from their home telephone station.

U.S. Pat. No. 4,313,035 issued Jan. 26, 1982, to David S. Jordan et al. patent discloses a method of providing a person locator service through multiple exchanges of the switched telephone network. Each subscriber is assigned a personal number uniquely identifying the subscriber. An absent subscriber inputs a number to which calls are to be completed, such as the number where the subscriber can be reached, into a central database. A caller wishing to reach the subscriber dials the number uniquely identifying that subscriber. In response to an incoming call directed to the unique number, a telephone switching office having access to CCIS sends the dialed number to the central database referred to by Jordan et al. as an SSP. The database retrieves the stored completion number for the called subscriber and forwards that number back to the switching office to complete the call. The subscriber can update the stored data from any telephone. Also, the subscriber can specify whether to charge calls via the person locator system to the subscriber or to the caller.

U.S. Pat. No. 4,899,373 issued Feb. 6, 1990, to Chinmei Lee et al. discloses a system for providing special telephone services to a customer on a personal basis, when the customer is away form his or her home base or office. A nationally accessible database system stores feature data in association with personal identification numbers. A subscriber wishing to use personalized features wile away from home base dials a special code from a station connected to any exchange which has access to the database and presents the personal identification number. The corresponding feature data is retrieved from the database and stored in the exchange in association with the station from which the request was initiated. The exchange then provides telephone service corresponding to the subscriber's personalized telephone features. A temporary office arrangement may be established in which the personalized features will be immediately available on incoming and outgoing calls for a period of time specified by the subscriber.

Further modifications of the AIN system allow a TELCO to customize the routing of telephone calls via a graphical programming language used on a specialized terminal by telephone company personnel.

As seen from the cited patents, the prior art AIN systems are exclusively land line communications systems, i.e., they provide telephone communication services via wired telephone lines, which to the subscriber typically is a tip and ring pair. The signaling protocol used for AIN allows only for control of telephone network switching elements in response to queries originated by network switching elements. Wired line communications, even those provided by AIN, are necessarily limited by the fixed nature of installed lines. These systems make no provision for communication to any mobile unit.

Separate radio-link communications systems have been developed which generally relied on the TELCO's only to provide trunks and voice communication to and from land line based parties. Operation of the mobility controllers of the mobile or radio network has been controlled entirely within the radio-link communication network.

The most common type of mobile radio link communication systems is the cellular radio telecommunications system (cellular telephone or mobile telephone system). The cellular telecommunications industry has developed roaming standards which when implemented will allow automatic handoffs from one cellular network to another during an established call, and to allow roaming from one system to another while having incoming calls follow the customer to the visited system. The protocol which accomplishes this are set out in the EIA/TIA publications IS-41.1-A, IS-41.2-A, IS-41.3-A, IS-41.4-A, and IS-41.5-A. For example, in all cellular systems conforming to IS-41 Rev. a. registration of an activated roaming mobile station takes place automatically even if a call is not in progress or being requested. The IS-41 protocol is an out-of-band signaling protocol which may be transported by either X.25 or SS7 links. No links to the land line network, however, have previously been established for IS-41 signaling.

The link between the mobile cellular user (CSS) and the appropriate base station (BS) uses particular radio frequencies mandated by the FCC. Dedicated trunk lines serve as the link between the base station and the mobile switching center (MSC), and the interface between mobile switching centers within the same system (same cellular provider) is generally provided by dedicated land lines. Data links connect the mobile switching center to a visitor location register (VLR), home location register (HLR), and equipment identity register (EIR), all of which can be located at the mobile switching center or at a remote point. All three registers may serve more than one mobile switching center. The HLR is the location register to which a user identity is assigned for record purposes, such as subscriber information, i.e., directory number, profile information, current location, validation period. The VLR is the location register, other than the HLR, which an MSC temporarily uses to store and retrieve information regarding a visiting subscriber or user. The differences between the VLR and the HLR are moot when handoff of a mobile user or subscriber is limited to the MSCs within a single system (single provider), since all the users are presumed to be listed in the home location register, and are validated on that basis. The VLR becomes important only when a subscriber who is not listed on the HLR of a cellular provider enters the system and registers. This situation is commonly described as roaming.

After determining that a roaming subscriber is currently within its surface area, the serving MSC sends a REGNOT (registration notification) to its VLR. The new serving MSC may detect a roaming subscriber's presence through automatic autonomous registration without a call request, call origination/call termination (such as a page response following a call to the roamer port), or a service order. If the roaming subscriber had previously registered with an MSC within the domain of the VLR, the VLR may take no further action other than to record the identity of the MSC currently serving the roaming subscriber. If the roaming subscriber was previously unknown to the VLR, or if the MSC registered information not available at the VLR, the VLR sends an REGNOT signal to the HLR associated with the roaming subscriber. The MSC recognizes this association based on the mobile identification number (MIN) reported by the roaming subscriber's mobil communication unit upon entering the new service area. The REGNOT signal sent from the VLR to the MSC may be contingent upon the response received from the HLR. For example, the roaming subscriber may not currently be a valid subscriber of the system in which the HLR is located.

If the roaming subscriber was previously registered elsewhere, the HLR sends a REGCANC (registration cancellation) signal to the previously visited VLR. That VLR (old serving system), upon receipt of the cancellation message, essentially removes all record of the roaming subscriber from its memory. The REGCANC signal can be sent by the HLR at any time after it receives the REGNOT signal. The new serving VLR creates an entry for the roaming subscriber in its internal data structure and may send a QUALREQ (qualification request) signal to the HLR in order to authenticate the roaming subscriber and determine the validation requirements. The VLR, if required, may then send a PROFREQ (service profile request) signal to the HLR to obtain the service profile for the roaming subscriber.

Many mobility controllers of the above described cellular systems are now programmed to provide subscribers selected special services. Normally, roaming subscribers engaged in "feature calls" which require special support by the system will not be handed off between systems. If the mobile subscriber has roamed to another system and registered on that system, normally the special features will not necessarily be allowed to the roamer. Normally handoff of a roaming subscriber in the "on-hook" state (not engaged in a call) will not take place when moving to a new system. Further, path minimization which is often found in the control scheme of a single system may not be provided for when a handoff of a roaming user from one system to another occurs. Thus, special services or features available to a subscriber through the home system are not available when the subscriber roams through other systems.

Data networks, such as X.25 packet switched networks, interconnect the mobility controllers with each other for data communications, for example to transfer necessary data from a subscriber's HLR to a VLR in the mobility controller the subscriber's mobile station is currently communicating with. The IS-41 protocols used by the mobile communications networks, however, have not been compatible with the protocols used to communicate between SSP's and the ISCP of the land based Advanced Intelligent Network.

There have been efforts to interface the two kinds of telephone device to provide unbroken access to at least one communication system at all times. One such arrangement is the well known cordless telephone. This telephone includes both a handset having a radio transceiver and a base station having a transceiver. The base unit connects to a land line system. A DTMF dialer in the base responds to control signals received through the base station transceiver to request telephone services, e.g., place a call. When an outgoing call is desired, a data stream is output from the handset over a radio link to the base station, initiating an interrogation routine in which the identity of the handset (usually required or programmed into a handset microprocessor) is confirmed at the base station. The desired telephone number is punched into a key set on the handset and output as a data stream. This data stream is received by the base unit and converted for use on the land line telephone system as DTMF signals.

Typically, both handset and base station include a microprocessor to control operations thereof. These operations include a registration between the handset and the base station before the base station will establish communication with the land line.

Registration can occur automatically when a handset enters the area of a base station. Alternatively, the registration between handset and base unit can occur when an incoming land line call is received by the base station or when the user seeks to make an outgoing call.

Since cordless telephones are generally controlled by microprocessors, a wide variety of functions such as intercom, three-way conversations, memory dialing, answering machine functions, and timed-automatic dial-out, are available. Also, since the base unit connects to a standard telephone, telephone network special services, such as those provided by AIN, are available to the handset via its associated base unit. Cordless handsets, however, use very little power and consequently have a very limited range with respect to the base station and consequently have limited range. Also, cordless telephone systems generally operate at different frequencies than those used by cellular telephone systems or microcell systems so that the cordless set cannot roam through the cellular network.

U.S. Pat. No. 5,329,578, issued Jul. 12, 1994, to Brennan et al., describes another system for providing personal number services in a personal communication services (PCS) system. This proposal also utilizes a dedicated PCS services node to reroute the call according to the subscriber's service profile stored in a database. The service node contains provisions for attempting to communicate with the subscriber with consideration for who is calling, when the call is made, and the urgency of the call. The subscriber is permitted control over the service profile. In this system the service attempts to locate the subscriber by "hunting", i.e., attempting to contact the subscriber at a series of likely or specified locations until the subscriber is reached.

U.S. Pat. 5,197,092 issued Mar. 23, 1993, to Bamburak, describes a system that provides location registration for a personal communicator within a personal communications network. The system includes a personal communicator, operable with a cellular telephone, which is part of a personal communications network which has the capability of maintaining a call forwarding number for the personal communicator. The personal communicator includes information for contact with the personal communications network. It also includes a receiving station wherein he receiving station includes a call forwarding number. The system further includes a means wherein the personal communicator and the receiving station can communicate with each other and means for communicating the call forwarding number to the personal communications network when the personal communicator is operatively positioned in the receiving station.

U.S. Pat. No. 5,251,248, issued Oct. 5, 1993, to Tokunaga et al., describes a personal number system that allows a subscriber to receive a call by a telephone registered under his/her personal telephone number no matter where he/she carries the telephone. This is accomplished in a memory within the network by maintaining a reference table of the personal telephone number assigned to each subscriber, a station number assigned to each telephone, and a subscriber loop address assigned to a telephone connection terminal of the network.

U.S. Pat. No. 5,155,860, issued Oct. 13, 1992, to McClure, describes a cellular portable telephone assembly which is adapted for use in connection with an automated registration and registration cancellation system such as that utilized in the management of rental cellular telephone units.

U.S. Pat. No. 5,353,331, issued Oct. 4, 1994, to Emery et al. and is commonly assigned with the present invention. That patent describes a comprehensive wireline/wireless integrated personal communication service. According to the patent, which is incorporated fully herein, the Advanced Intelligent Network (AIN) wireline system connects to and controls processing of calls to a Personal Communication Service subscriber's wireless handset via a home base station or a wireless communication network. Depending on its current location, the subscriber's handset automatically registers with the base station or with a mobility controller of the wireless network. A new registration with the base station when the handset comes within range causes that station to update the subscriber's home location register in a central database of the AIN. Similarly, when a handset first registers with a mobility controller, that controller updates the subscriber's home location register in the central database of the AIN. In response to calls directed to the subscriber, the AIN accesses the Home Location Register (HLR) to determine the current location where the handset is registered. The AIN then uses that data to route the call to the current location. In response to calls from the handset, the central database provides instruction data to the land line network and/or a mobility controller to extend a requested special service to the calling subscriber.

DISCLOSURE OF THE INVENTION

The present invention is directed to a simplified registration system which may be manual or automatic and permits utilization of existing land line and wireless or cellular equipment and installations to provide a Single Directory Number Service (SDNS). The registration programs the SDNS to either direct the call to the wireless network or to one of multiple predesignated land line directory numbers. Manual registration may be effected by depressing a button. Automatic registration may be effected in a simplified and economic fashion by the subscriber physically approaching within a predetermined distance of a predesignated land line telephone and initiating an interaction between relatively inexpensive adjuncts to the conventional land line, cordless and mobile telephone systems.

According to one embodiment of the invention using adjunct equipment, depressing of a button on an adjunct unit (manual), or entering the predetermined area of an adjunct unit (automatic), has the effect of pulling dial tone to the land line terminal from the involved end office. This is followed by the adjunct unit causing auto-dialing an 800 number which is the Advanced Intelligent Network (AIN) database. On receiving back stutter tone identifying the AIN, the unit downloads multi-frequency, touch tones to identify itself and to identify the location in a conventional manner. The location is identified by a three digit code which can be associated with one of two land line locations. These usually would be "at home" or at a "business" land line directory number. Upon receiving a stutter tone back the terminal disconnects.

When the subscriber's transceiver is turned on in the cellular mode registration is effected over an SS7 (CCITT Signaling System 7) link via a Class 4/5 Office that is tied to the ISCP. An IS-41 message is passed from the cellular switch to the ISCP to indicate that the cellular transceiver is in the cellular environment. The IS-41 protocol is an out-of-band signaling protocol which may be transported by either X.25 or SS7 links. Following that signal, incoming calls to the single number are directed to the cellular environment.

The SS7 network does the transport in both registration and queries. According to the invention, the registration is maintained in a database in the ISCP. The signals passing through the Class 4/5 switch are DTMF tones identifying the personal line phone number which is the phone number of the mobile device. This establishes communication to the ISCP and the ISCP then downloads a three digit number to indicate whether the location is the home or the office.

The manual device or the triggered device constitute a separate registration station associated with the local loop to the POTS (Plain Old Telephone Service) telephone at the site. The registration-station in broad terms comprises a switch which initiates auto-dialing when the button is pressed or a switch which is triggered by the presence of the subscriber to initiate such dialing. For the automatic embodiment, the registration station includes a very low power transceiver which periodically scans or transmits a limited strength signal to attempt to sense the presence of the subscriber. The subscriber carries what may constitute a small key chain device which comprises a transceiver. The transmitters associated with the transceivers emit a signal which is limited in range to the premises of the home or business location of the subscriber. The two transceivers in the adjunct units essentially do a handshake which is coded in a manner similar to a garage door opener or remote automobile lock control. Similar registration devices are used at the home and office with the only difference being the three digit code that identifies the location in the look-up table in the ISCP. The calls are directed to the destination indicated by the registration in that look-up table.

According to the preferred embodiment there is no de-registration. However, it is within the purview of the invention to effect de-registration in the automatic mode when the key chain device ceases to respond to the scanner in the base station or in the manual mode by again pressing the button. However, in the preferred embodiment no de-registration occurs, but rather the next registration writes over or erases the pre-existing registration in the database.

At times a situation may occur where the subscriber is registered at a site, for example, the home, and goes out for a walk, so that a call directed to that telephone results only in a no answer condition. In that circumstance, according to the preferred embodiment, the call would be delivered, would result in a no answer situation detected by the ISCP after a predetermined number of unanswered rings, and the call would then be forwarded back to a voice mail box. On the other hand, with the de-registration embodiment a call may go directly to a voice mail box without connection to the called telephone to establish the no-answer situation.

According to another embodiment of the invention, the manual version of the registration device or station may include a second button to establish call forwarding. Following keying of the second button the subscriber may then key in an alternate number, such as the phone number of a neighbor, followed by depressing a keypad button to launch the update registration, which sends the neighbor's telephone number to the ISCP. Upon arriving back home, the subscriber may again depress the second button to cancel that command.

When the user moves from the land line environment to a mobile environment, regular overhead messaging occurs as soon as the mobile transceiver is turned on to register presence in the mobile environment. An IS-41 registration message initiates signaling through the STP to the ISCP indicating that the subscriber is in the cellular environment and effecting registration in the ISCP database. Incoming calls then trigger an SS7 message from the Class 4/5 switch to the ISCP. The answer returns from the ISCP to direct forwarding of the call to the cellular environment. The standard message is sent to the MSC (Mobile Service Controller) determine the condition of the mobile, i.e., on, off dr busy. If the mobile unit is on the switch goes back the ISCP with a temporary telephone number which is aligned with the number with the mobile unit, and that information is call forwarded out of the Class 4/5 switch to the MSC with a temporary phone number. When the MSC receives the number it does a comparison with the MIN (Mobile Identification Number), and then delivers the call to the MIN or portable unit. The temporary phone number is used because in this environment the mobile unit is treated as a roamer, i.e., not a home user in this cellular network, even though the user may be in the city of his/her residence. In this cellular network the actual home is in the land line ISCP. In order to get the call to the person using the NPA-NXX it is given a number that resides in the MSC. This is similar to what would happen to a regular cellular user if the subscriber was roaming in a different city. There would be a completely different NPA-NXX for that city, but the system for that city would return the TLDN which would be that city's NPA-NXX. It would get out to that city and be delivered with the cellular MIN.

According to another embodiment of the invention, registration or de-registration may be effected at a land line station with an ISDN connection without requiring completion of connection to the telephone station and auto-dialing to effect storage of the registration in the database at the ISCP. In this embodiment the registration or de-registration trigger from the land line's telephone is effected by having the registration station, whether triggered manually or automatically, send a signal that the end office recognizes to signal registration or de-registration to the ISCP over the SS7 network or equivalent signaling means, such as ISDN. In this embodiment the registration or de-registration is effected without tying up a voice line as with the auto-dialed 800 number call previously described.

According to a still further embodiment of the invention, the registration station at the telephone site may send a signal to the end office to alter the subscriber profile or translation in the end office switch. This ability may be utilized to reduce the amount of signaling necessary to SDNS call delivery. According to this embodiment of the invention the SDNS incoming call to the personal number is first directed to the home based on the programming of the Class 4 switch which connects the land line and mobile networks. Assuming that the subscriber is at home the subscriber profile at the EO for the home is in its normal state and the call and the call is accepted and completed. If the subscriber leaves home the adjunct registration station at the home is either manually or automatically caused to initiate a signal to the EO switch to alter the subscriber profile or translation to block the call and either direct it to the subscriber's mail box or to a designated call forwarding number, such as a neighbor's residence as previously stated. Such call forwarding by subscriber programming of his/her service profile is described in the common assignee's U.S. Pat. No. 5,054,055 issued Oct. 1, 1991, to Hanle et al.

The office registration station may also be equipped to alter the user profile or translation in the EO switch associated with the office. Then a call directed to the office by the ISCP will result in an SS7 query to the EO. If the subscriber is present at the office and has not altered the profile, the call is completed to the office telephone terminal. On the other hand, if the subscriber has caused the registration station at the office to alter the subscriber's office profile to block the call, the call will thereupon be routed to voice mail. This arrangement permits elimination of both auto-dialing signaling as well as the number of inquiries which are directed to the ISCP.

In the absence of an ISDN connection, registration utilizing the end office switch user profile may be effected, according to another embodiment of the invention, by programming the registration station so that actuation of its switch, manually or automatically, draws dial tone, and then, instead of auto-dialing a predetermined number, the registration station sends a distinctive tone or signal to cause the involved EO to make the appropriate change in the switch profile or translation of the subscriber as described above. Both embodiments, ISDN and non-ISDN, effect a form of virtual registration using equipment in the end office switches to reduce the volume of signal handling by the network.

According to still another facet of the invention the automatic registration may include use of a so-called smart key chain device to permit registration at a common registration station such as a restaurant. The restaurant registration station is provided with a transceiver that regularly scans, as with the previously described embodiments. The scan triggers any smart key chain devices within range. The trigger causes the smart key chain device to download to the registration device information identifying the subscriber and effect registration at a directory number (DN) for a telephone terminal maintained by the restaurant. The registration station at the restaurant stores the registration via the SS7 network into the ISCP database. According to an alternative embodiment, the restaurant may display a sign that the service is available. The subscriber may then manually activate a switch and key pad in an adjunct device at the restaurant to effect registration if desired.

MODE FOR CARRYING OUT THE INVENTION

The single directory number service of the present invention uses an Advanced Intelligent Network (AIN) type architecture together with elements of a mobile communications system such as a cellular radio telephone network. A conceptual example of an AIN and cellular system for implementing the service appears in simplified block diagram form in FIG. 1.

Figure 1:
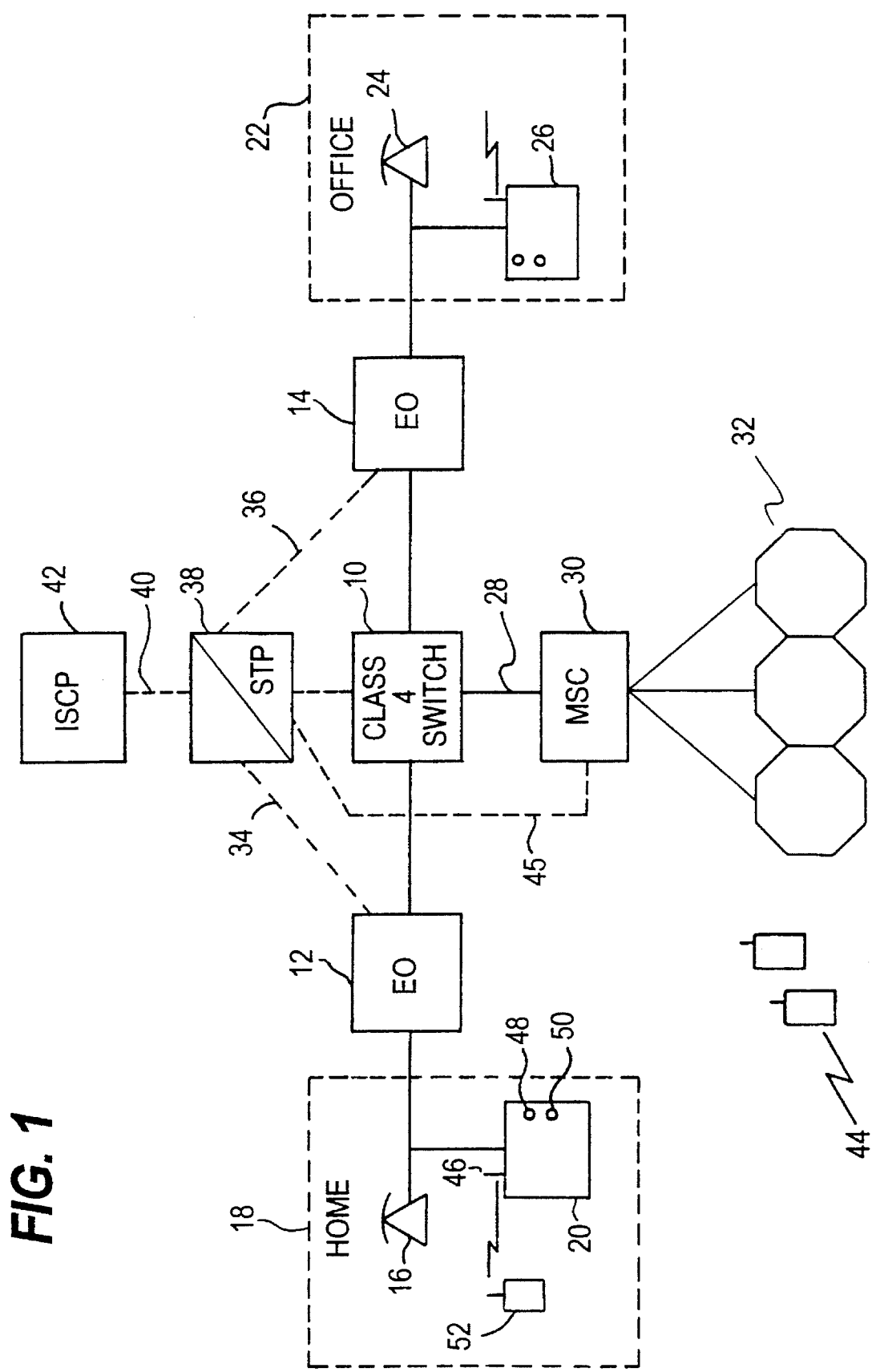
FIG. 1 provides a conceptualized illustration, in general block diagram form, of a communications system for implementing the single directory number communications service of the invention.

In the simplified diagram of FIG. 1, one or more central office switches, such as the Class 4 or 5 (4/5) switch 10 are located throughout a state or region served by a telephone company (TELCO) providing the Single Directory Number Service (SDNS). Trunk lines connect the Class 4/5 switch 10 to end office switches 12 and 14 either directly or through trunks and other switches. Each end office is connected to individual telephone terminals, for example, to the Plain Old Telephone Service (POTS) phone 16 at a subscriber's home 18, and to a registration station 20 (described in detail below). Similarly, the end office 14 may be connected to a telephone terminal in the subscriber's office 22 which may be a POTS phone 24 or a more sophisticated termination. The office 22 also contains a registration station 26 connected to the end office 14.

The Class 4/5 switch 10 connects via trunk circuit 28 to the cellular mobile switch controller (MSC) or mobile telecommunications switching office (MTSO) 30. The MSC or MTSO is connected by voice and data links to the base stations in cells indicated at 32 in a convention manner. Each central office has a Common Channel Interoffice Signaling (CCIS) type data link going to an STP as shown at 34 and 36 connecting the end offices 12 and 14 to the STP 38. A CCIS packet switched data link 40 connects the STP 38 to an Integrated Service Control Point (ISCP) 42. The MSC or MTSO 30 connects to base stations and antennas for the cell sites 32 in the conventional manner to provide wireless communications services to cellular or PCS portable handsets 44. The MSC is also connected by a CCIS type data link 45.

Each registration station 20–26 is bridged onto the local loop connecting the telephone terminal to the end office. According to which embodiment of registration station is utilized, the registration station may be provided with a transceiver and transceiver antenna 46 and/or may be provided with one or more buttons or keys 48, 50 to actuate internal switches. Where the registration station is provided with a transceiver, as may be utilized for automatic registration, each subscriber is provided with a small transceiver device which is sometimes referred to herein as a key chain unit. Such a unit is shown diagrammatically at 52 in FIG. 1 and is hereafter described in further detail.

Figure 2:
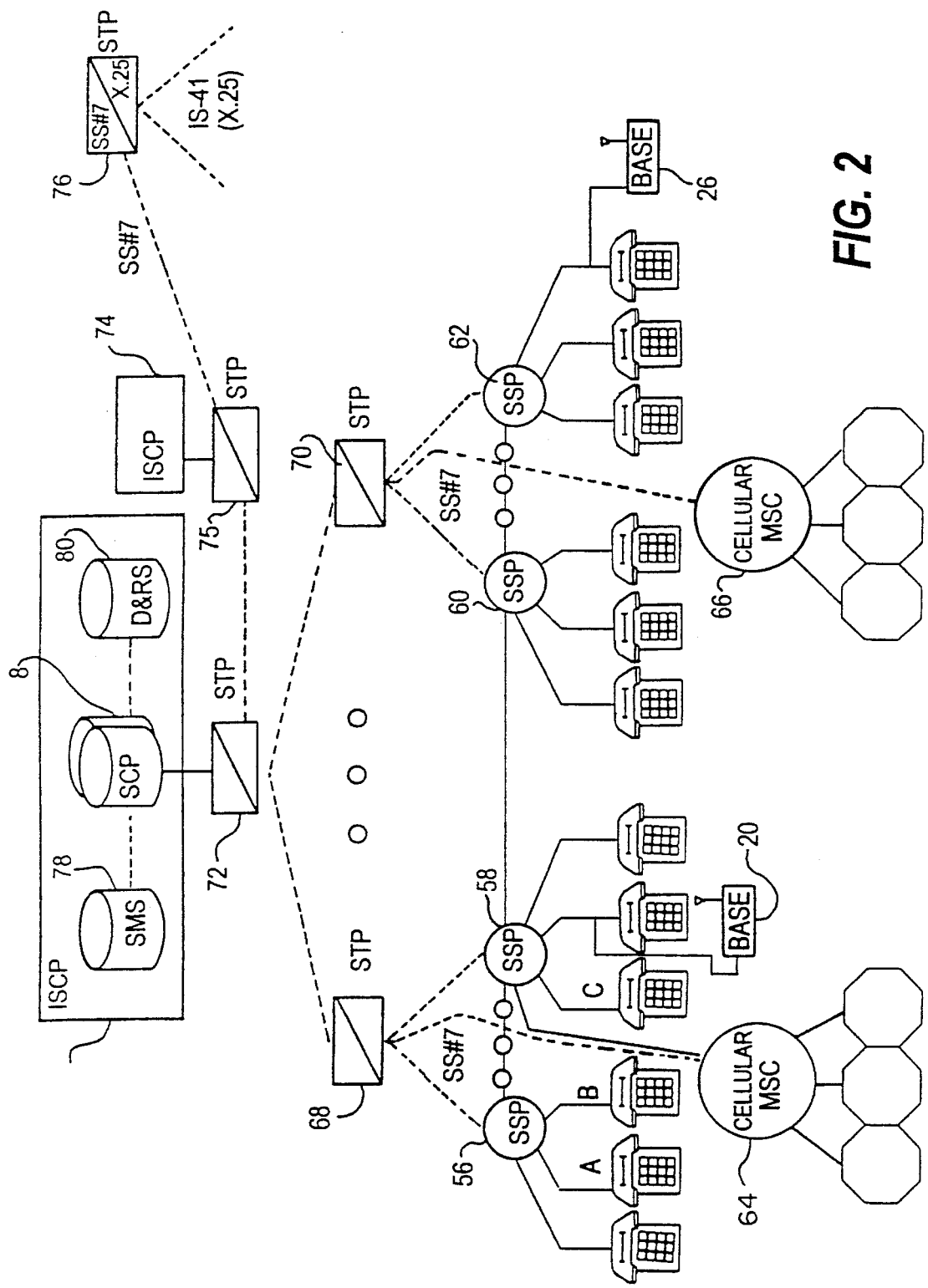
FIG. 2 is a more specific block diagram of one embodiment of an integrated land line and wireless communication system used in the present invention.

FIG. 2 is a schematic block diagram of the components of an AIN type integrated land line and wireless system, similar to the system of FIG. 1, but showing somewhat more detail. In this figure, each of the Central Office (CO) or End Office (EO) switches is labeled as an "SSP." These Service Switching Points, referred to as SSP's, are appropriately equipped programmable switches present in the telephone network, which recognize AIN type calls, launch queries to the ISCP and receive con, hands and data from the ISCP to further process the AIN calls.

SSP's can be programmed to recognize a number of different triggers as an indication that a call is an AIN call. For example, the trigger can relate to the identification of the telephone line from which a call or other request for service originates, and such a trigger is useful for activating certain services. At least initially, however, for incoming SDNS type calls the trigger is based on a recognition that the terminating station identified by the destination number is an SDNS subscriber.

A shown in FIG. 2, all of the EO's 56–62 are equipped and programmed to serve as SSP's. Such central office switching systems typically consist of the above discussed Class 4/5 programmable digital switch with CCIS communications capabilities. One current example of such a switch is a 5ESS type switch manufactured by AT&T; but other vendors, such as Northern Telecom and Siemens, manufacture comparable digital switches which could serve as the SSP's.

A number of subscriber telephone lines connect to each of the SSP's which provide switched telephone communications services to subscriber terminals coupled to those telephone lines. Many of the TELCO's subscribers have POTS terminals, as shown. Those who subscribe to SDNS (Single Directory Number Service) will have a home registration unit, such as shown at 20 and 26. The registration unit may connect to the line in parallel with one or more standard telephone station sets as shown.

To provide wireless mobile communications, the network further includes a number of MSC's which communicate with the SSP's, STP's and ISCP of the AIN type telephone network. As shown in the drawing, the network includes cellular MSC's 64 and 66. Each of the MSC's connects to an SSP type central office switch via a voice telephone trunk, shown in solid lines and each also connects to one of the STP's via an SS7 link.

The SSP's 56 and 58 connect to a first local area STP 68, and the SSP's 60 and 62 connect to a second local area STP 70. The connections to the STP's 56 and 58 are for signaling purposes. As indicated by the black dots below STP's 23 and 25, each local area STP can connect to a large number of the SSP's. As shown by solid lines in FIG. 2, the central offices or SSP's are interconnected to each other by trunk circuits for carrying telephone services.

The local area STP's 68 and 70, and any number of other such local area STP's, shown as black dots between STP's 68 and 70, communicate with a state or regional STP 31. The state or regional STP 72 in turn provides communications with the ISCP 73. The STP hierarchy can be expanded or contracted to as many levels as needed to serve any size area covered by the SDNS service and to service any number of stations, central office switches, mobility controllers and mobile communication units.

The links between the SSP's and the local area STP's are CCIS links, typically SS7 type interoffice data communication channels. The local area STP's are in turn connected to each other and to the regional STP 72 via an SS7 packet switched network. The regional STP 72 also communicates with the ISCP 73 via a packet switched network communications.

Other networks can have an architecture essentially similar to that described above. The local area STP 72 communicates with a regional STP 75 of the second network. The STP 75 provides CCIS type data communications with the second ISCP 74 and with the SSP's and ISCP's of other networks, for example by packet switched connection to STP 72.

The above described data signaling network between the CO's and the ISCP is preferred, but other signaling networks could be used. For example, instead of the CCIS links, STP's and packet networks, a number of MC's together with several CO's and an ISCP could be linked for data communication by a token ring network. Also, the SSP capability may not always be available at the local office level, and several other implementations might be used to provide the requisite SSP capability. For example, none of the end office switches may have SSP functionality. Instead, each end office would connect to a trunk tandem which in turn feeds calls to a central SSP capable switch. The SSP then communicates with the ISCP, as in the implementation described above, but in this case via an SS7 type CCIS link. In another embodiment, some of the end offices are SSP capable, and some are not. Again, each of the end offices normally communicates through a trunk tandem. For the SSP capable switches, they communicate directly with an STP which relays communications to and from the ISCP, in the same manner as in the embodiment of FIGS. 1 and 2. For those end offices which lack SSP capability, calls are forwarded to the SSP capable trunk tandem which in turn relays data to and from the ISCP. In these alternate embodiments, the SS capable trunk tandem switches are digital switches, such as the 5ESS switch from AT&T.

The MSC's are connected with each other via IS-41 protocol trunks for exchange of data relating to handoff and to exchange of data for extending services to visiting subscribers of distant cellular systems. The IS-41 data trunks are actually a packet switched network, which may be either an X.25 network or an SS7 network. To provide handoff during a wireless call in progress, the MS's are also interconnected via trunk circuits (not shown).

To allow data communication of HLR (Home Location Register) data registered in the ISCP's 73, 74, to visitor location registers in remote MSC's, the network further includes a hub STP 76. The hub STP connects to an X.25 packet switched data network, which currently carries IS-41 data messages between existing MSC's outside the illustrated service area. The hub STP 76 couples IS-41 messages between the X.25 network and the SS7 network, shown by the dotted line data communication link to the regional STP 75. The communication through the hub STP 76 allows outside MSC's to communicate with the ISCP's of two or more networks providing the SDNS type services as if the ISCP's were home location MSC's for the subscribers when visiting another service area.

The messages transmitted between the SSP's and the ISCP's are all formatted in accord with the Transaction Capabilities Applications Protocol (TCAP). The TCAP protocol provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

As shown in FIG. 2, the ISCP 73 is an integrated system. Among other system components, the ISCP 73 includes a Service Management System (SMS) 78, a Data and Reporting System (DRS) 80 and the actual database or Service Control Point (SCP) 82. The ISCP also typically includes a terminal subsystem referred to as a Service Creation Environment or SCE (not shown) for programming the database in the SCP 82 for the services subscribed to by each individual business customer. Although not shown in detail, the ISCP 74 will typically have a similar integrated system structure. Alternatively, the second ISCP 74 may not be an "integrated" system. For example, the second unit 74 may include only a database system similar to that of the Service Control Point (SCP) 82.

For standard telephone service, each central office switching system normally responds to a service request on a local communication line connected thereto to selectively connect the requesting line to another selected local communication line. The connection can be made locally through only the connected central office switching system. For example, for a call from station A to station B, the SSP 56 provides the call connection without any connection to another central office. When the called line connects to a distant station, for example when station A calls station C, the connection is made through the connected central office switching system SSP 56 and at least one other central office switching system SSP 58 through the telephone trunks interconnection the two CO's.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signaling, the trunks would be engaged before a determination is made that the called line is available or busy. Particularly if the called line is busy, this would unnecessarily tie up limited trunk capacity. The CCIS system through the STP's was developed to alleviate this problem.

In the CCIS type call processing method the local central office suspends the call and sends a query message through one or more of the STP's. The query message goes to the central office to which the called station is connected, referred to as the "terminating" central office; for example, the query would go from originating SSP 56 to terminating SSP 58. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations connected to land lines. In an AIN system implementing SDNS and/or Personal Communication Service, these normal call processing routines would still be executed for completion of calls originating from stations not subscribing to the service.

Figure 3:
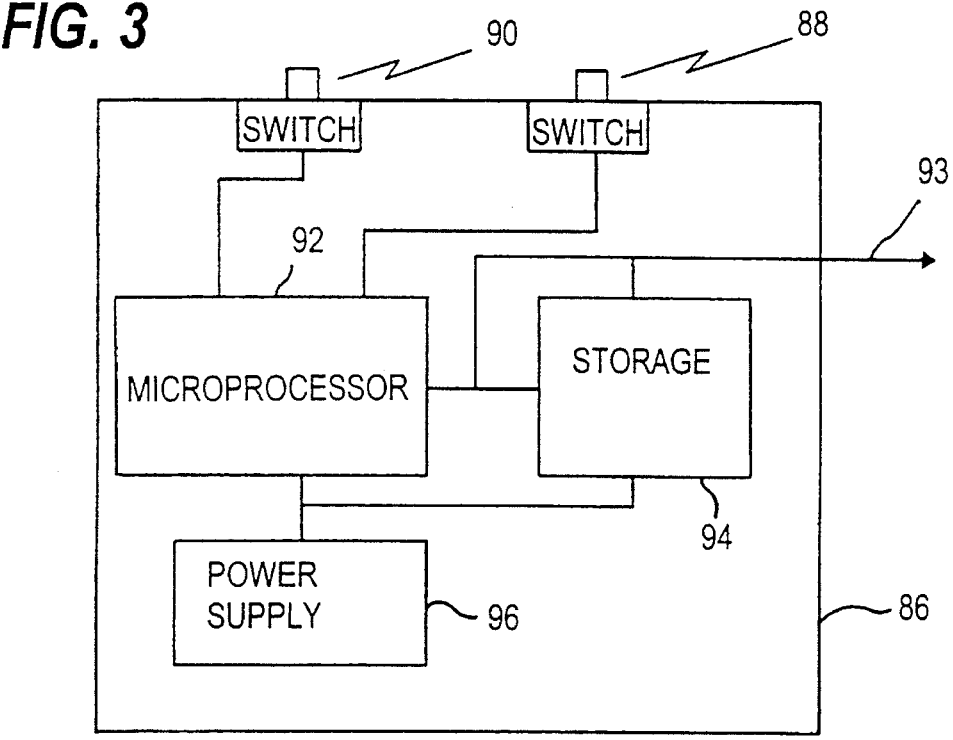
FIG. 3 is a diagrammatic drawing of a manually operated adjunct registration device.

Referring to FIG. 3, there is shown a manually actuatable registration device 86 for use in proximity to the customer premise terminal to be registered in association with the personal telephone number of a subscriber. The unit contains a first manually actuatable switch 88 for effecting registration. A second manually operable switch 90 is provided for blocking calls to the terminal associated with the registration device and/or forwarding calls either to a voice mail box associated with the subscriber or to an alternate directory number which may be entered by the subscriber. The call blocking is effected by changing the subscriber profile in the central office associated with the terminal and a second actuation of the same manual, switch may permit the subscriber to key in a forwarding directory number using the DTMF key pad of the customer premise terminal in the manner described in the aforementioned Hanle et al. U.S. Pat. No. 5,054,055. The device is provided with a microprocessor 92, storage 94 and power supply 96 which may comprise suitable battery power. A line 98 provides a connection for bridging to the incoming communication line to the subscriber terminal.

Figure 4:
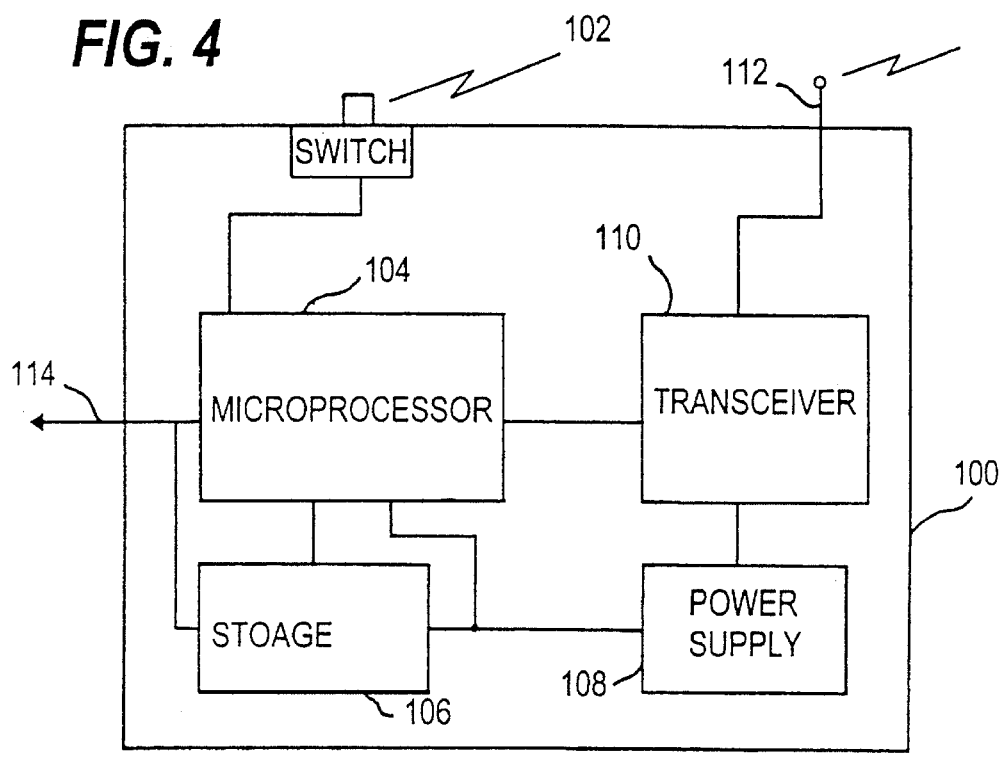
FIG. 4 is a diagrammatic illustration of an adjunct registration device for effecting automatic registration and having a manual switch for effecting call blocking or call forwarding.

The automatic registration device 100 shown in FIG. 4 includes a manual switch 102 for effecting call blocking and/or forwarding, microprocessor 104, storage 106, and power supply 108. The automatic registration device also includes a transceiver 110 capable of radiating a signal over a very limited area such as the residence of the subscriber. An antenna 112 is provided for this purpose. The automatic registration device is connected to the communication line via line 114. The portable registration device 52 in FIG. 1 is also provided with a miniature transceiver, microprocessor, memory and source of power which is preferably battery power similar to that utilized in calculators and devices such as the key chain automobile latch devices.

The registration system provides registration for the routing of a call to a subscriber to a personal telephone number service in an integrated wired and wireless communications network such as shown in FIGS. 1 and 2 in the manner now described. In the automatic embodiment, a first adjunct registration device of small size is provided to each subscriber to be carried by the subscriber, for example, in the manner of a key chain device such as an automobile lock actuator. The portable registration device contains a transceiver programmed to respond to receipt of a predetermined wireless signal.

A second adjunct registration device, such as the device 100 in FIG. 4 and 26 in FIGS. 1 and 2, is located at the site of the land line terminal which the subscriber selects for registration in the system. As shown in FIGS. 1 and 2, the registration device is bridged to the communication line connecting the terminal unit to the telephone network. The registration device at the site of the terminal periodically scans or transmits a limited strength signal to attempt to sense the presence of the subscriber. When the subscriber carrying the portable unit enters the mutual range of the two registration units, i.e., the unit sending the scanning signal, and the transceiver in the portable unit, the portable transceiver detects the scan signal and transmits a response. This response is detected by the terminal registration device to, in essence, complete a handshake operation.

This initiates action in the stationary registration device via the microprocessor and storage, whereby a signal is transmitted over the premise link with the telephone network to the service switching point (SSP) serving that terminal. According to one mode of operation, the stationary registration device auto-dials a predetermined number, such as an 800 number which is identified with the AIN database. On receiving back stutter tone identifying the AIN, the unit downloads multi-frequency touch tones to identify itself and to identify the location in a conventional manner. The location is identified by three digit code which can be associated with one of two land line locations, such as the home and the office. Upon receiving a stutter tone back, the unit disconnects. As a result of the exchange, the AIN ISCP stores the home directory number as the present registration of the subscriber.

In the manual embodiment, the same sequence may be carried out by the subscriber depressing the button 88 to actuate the switch in the stationary registration unit at the site of the residence telephone terminal. This mode of utilization of the system involves the creation of an off-hook condition at the terminal under control of the registration device. This draws dial tone and connection is made over the local loop and any intervening links to the SSP serving the particular terminal. The number which is auto-dialed is detected by the SSP as requiring an AIN connection and triggers the formation of an appropriate TCAP message through the STP to the ISCP.

An alternative to this procedure is provided in an embodiment wherein the stationary registration device causes an off-hook condition at the terminal end of the local loop or communication line and upon establishment of connection immediately dispatches a data message which triggers the SSP to dispatch a TCAP registration message to the STP and ISCP.

Still another embodiment of the invention permits avoidance of establishment of the local loop connection to the SSP. This embodiment utilizes a data link from the registration device is available to the SSP. Such a link may be provided, by way of example, by utilizing an ISDN connection to the terminal and utilizing the D channel of the ISDN link to directly communicate with the SSP and ISCP.

Once the registration of the subscriber as being located at the residence terminal is stored in the storage of the ISCP, incoming calls to the personal telephone number trigger a TCAP inquiry to the ISCP. The ISCP responds with routing directions which indicate that the subscriber may be reached at the residence terminal directory number. Such a connection is thereupon established through the network.

If the subscriber located at his/her residence location desires to block or forward calls without changing the registration, such as to establish a "do not disturb" condition, or to have the calls forwarded to a different destination, such as the subscriber's voice mail box or a different directory number, this may be effected by depressing the blocking button or switch 90 or 102 as the case may be. Actuation of the switch causes the stationary registration device to create a call blocking situation by changing the user profile of the subscriber at the central office where that profile is located. This may be effected by using connection to the central office and simply setting the bit for call blocking in the user profile. Where call forwarding is desired, the forwarding destination may be established in the manner described in detail in the above mentioned Hanle et al. U.S. Pat. No. 5,054,055. Call blocking may be set up in the manner described in U.S. Pat. No. 5,060,255 to Brown, which is commonly assigned with the instant application.

According to a still further embodiment of the invention, the blocking and/or call forwarding conditions may be established using the data channel of an ISDN connection or the equivalent between the stationary registration device and the network.

The office premise terminal of the subscriber may be registered in the same manner utilizing a similar registration device or devices at the office site. Similar call blocking and/or forwarding may also be effected in the same manner.

When the user moves from the land line environment to a mobile environment, regular overhead messaging occurs as soon as the mobile transceiver is turned on to register presence in the mobile environment. An IS-41 registration message initiates signaling through the STP to the ISCP indicating that the subscriber is in the cellular environment and effecting registration to that effect in the ISCP database. Incoming calls then trigger an SS7 message from the Class 4/5 switch to the ISCP. The answer returns from the ISCP to direct forwarding of the call to the cellular environment.

Figure 5:
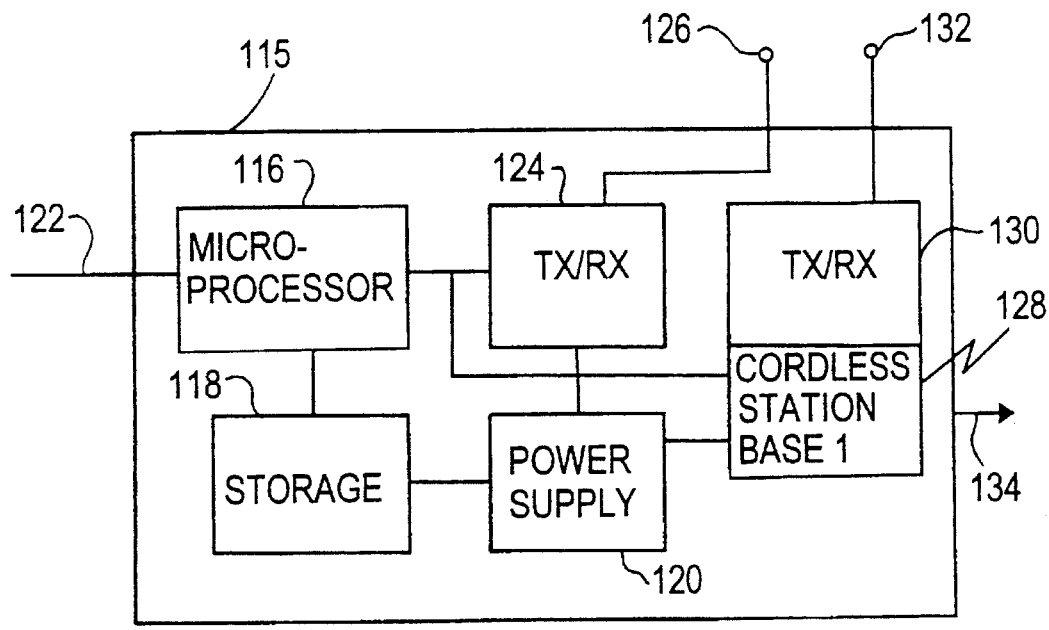
FIG. 5 is a diagrammatic illustration of an adjunct registration device for effecting automatic registration at a common gathering place.

Referring to FIG. 5, there is shown an adjunct registration device 115 suitable for effecting automatic registration at a common or public gathering place such as a restaurant. The unit contains a microprocessor 116, storage 118 and power supply 120 which ay be supplied by batteries or from the power mains. A line 122 provides connection to the end office serving the premises. A first transceiver 124 is connected to a local antenna 126 for communicating with customer carried portable registration devices, such as a key chain or the like units. The portable registration units used according to this embodiment of the invention are similar to those previously described with added features and will be referred to as smart portable registration devices. The smart portable devices have all of the capabilities of the previously described units but also possess the capability of transmitting a signal identifying the device and/or the single personal directory number of the user or subscriber. According to one embodiment of the invention the adjunct registration unit in FIG. 5 also includes a second transceiver 130 which may form part of unit 128 which corresponds to the base station of a conventional cordless telephone without a removable handset, although the transceiver in the unit may operate at cellular rather than cordless telephone frequencies. The transceiver 130 is provided with a suitable local antenna 132. The telephone station device 128 is connected to the end office via connection 134.

This embodiment of the invention is designed for use in establishments which may wish to provide convenient premise registration for customers or guests who are subscribers to single directory number service and who possess a smart portable registration unit. The smart units may be provided to all personal or single number customers of the service or may be provided only to those subscribers desiring the extra gathering place registration service for an added service charge. The type of adjunct registration device provided in the gathering place or establishment will also vary with the sophistication of the service rendered and the number of available incoming lines from the end office.

Figure 7:
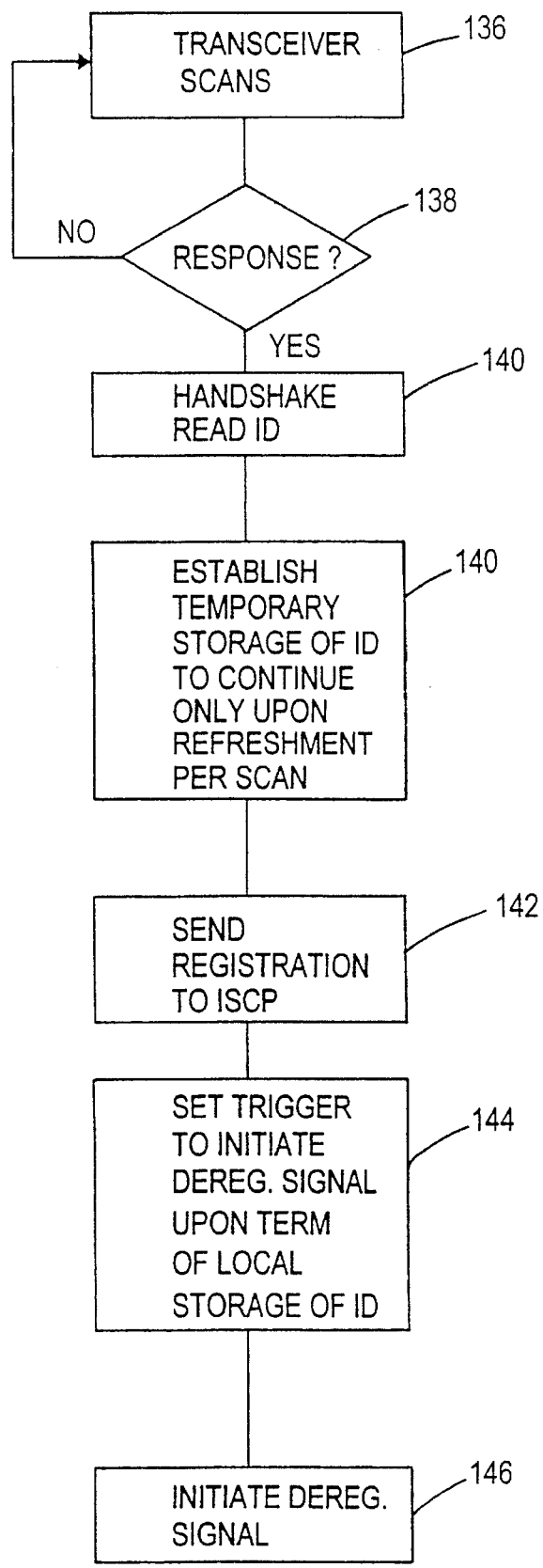
FIG. 7 is a flow diagram illustrating one mode of operation of an adjunct registration device at a common gathering place.

The operation of an establishment maintained adjunct registration device with customer carried smart portable registration units is now described according to one embodiment of the invention in connection with the flow diagram shown in FIG. 7.

Referring to FIGS. 5 and 7, the transceiver 124 under control of the microprocessor 116 transmits periodic scanning signals as previously described with respect to prior embodiments of the invention. This is shown in the flow diagram at 136. On receiving no response the scanning continues without other activity. The smart portable registration devices also carry a miniature transceiver and microprocessor and will respond to the scan signal when the portable unit comes within range. The smart unit handshakes with the adjunct unit and provides identification which either includes the single personal telephone number or an identifier through which the personal telephone number may be ascertained from the adjunct unit or from the network. The detection of the response from the smart unit entering the premise is shown in FIG. 7 at 138.

The adjunct 115 in FIG. 5 reads the identification at 140 in FIG. 7 and stores the identification in storage 118 (FIG. 5) on a temporary basis, i.e., for the period of a scan. This storage is then erased but is subject to maintenance by refreshment by subsequent scans which bring a response and identification as shown at 140 in FIG. 7.

Substantially at the same time as the storage is effected in the local storage 118, registration is effected with the ISCP as previously described and as indicated in FIG. 7 at 142. Also at substantially the same time a trigger is set in the SSP which will initiate a TCAP deregistration signal to the ISCP upon tripping of the trigger by receipt of a signal from the adjunct registration device 115 which is programmed for dispatch upon termination of the storage of the customer identification in the local database or storage 118 in the adjunct registration unit. This is shown in FIG. 7 at 144.

When the storage in the local database terminates because of lack of response from the previously registered smart portable registration unit, the deregistration signal is triggered and initiated to the ISCP as shown in FIG. 7 at 146. It will be apparent that other programming algorithms may be used to cause registration by the local adjunct unit when the customer enters the premise and his portable registration unit responds and identifies itself and when the customer leaves and his portable unit no longer responds to the scan of the adjunct unit at the establishment.

Once registration at the establishment telephone station is effected calls to the personal or single number of the subscriber will be directed over the land line telephone network to that telephone station. According to this embodiment of the invention the establishment of a communication link to the customer may then be effected by any one of several methods. If the adjunct registration unit at the establishment is provided with a cordless type telephone base station unit, such as unit 128–130 in FIG. 5, which operates at cellular frequencies, the mobile communication handset of the subscriber may be rung and answered by the subscriber. Alternatively the mobile communication handset or the smart portable registration device may be equipped in the manner of pagers and the customer may receive a paging signal which can be broadcast by a known form of unit 130 in FIG. 5. The customer may be alerted either by an audible tone or beep or by vibration which will not cause a disturbance to other customers. The paged customer may then establish communication with the calling party either using the land line telephone station in the establishment or via the cellular network using his mobile communication handset.

Figure 6:
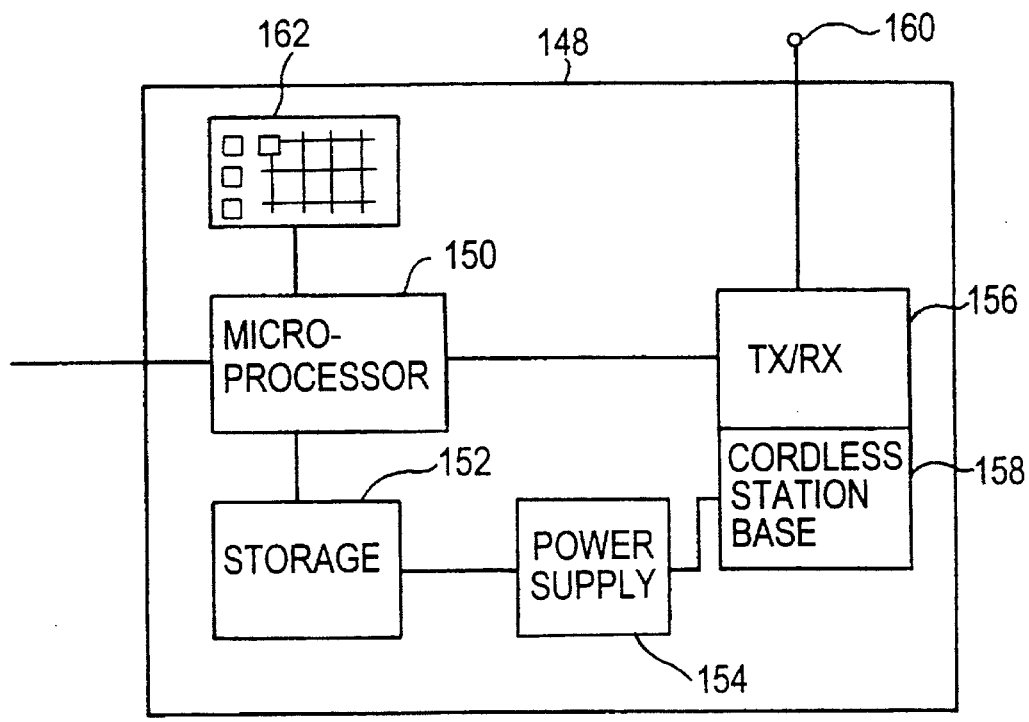
FIG. 6 is a diagrammatic illustration of another embodiment of an adjunct registration device for effecting registration at a common gathering place.

Another embodiment of a system and method for communicating with a single number subscriber in a public or other gathering place is illustrated in FIG. 6. Referring to that figure, the automatic adjunct registration device of FIG. 5 is replaced with a manual unit indicated at 148. The manual adjunct device is provided with a microprocessor 150, storage 152, power supply 154, and cordless telephone and/or pager unit 156–158 and antenna 160. In this embodiment the adjunct registration unit is also provided with a suitable keypad 162, which may be a DTMF keypad or a full keyboard. The keypad or keyboard need not be combined with the adjunct registration unit but may be separately mounted in a position convenient to customers of the gathering site.

According to this embodiment of the invention the establishment may advertise the availability of the single number land line registration service and invite customers to manually record their presence and telephone number. Such registration may be accomplished by the customer using the keyboard to enter their identification and/or number using the keypad or keyboard. Once registration has been effected in this fashion the customer may then receive the same type of service just described in relation to FIGS. 5 and 7. In this embodiment of the invention there may be no automatic deregistration actually responsive to the presence of absence of the subscriber. In order the accomplish deregistration and clear the storage and ISCP registers of registrations which become erroneous in time, a timing function is programmed into the microprocessor for erasing a registration after the passage of a preset time period. Most conveniently this is a fixed period but may be programmed by the subscriber on keying in the registration.

It will be apparent that the embodiments of the invention described in detail in relation to FIGS. 5, 6 and 7 extend the capabilities and flexibility of single or personal number service to an additional large segment of the business and entertainment establishments. This provides significant additional convenience to the subscribers and enhances the economy of the service by providing land line connection as an alternate to wireless service.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A registration system for routing a call to a subscriber to a personal telephone number service in an integrated wired and wireless communications network, comprising:

a central office switching system connected to communication lines connected to subscriber premise terminals including at least one service switching point for selectively providing switched communications between the communication lines;

a mobile switching center connected to the central office switching system arranged for selectively providing wireless communications between said central office switching system and wireless mobile communications units by using control data conveyed to at least one service switching point through a service transfer point;

a network controller arranged for selectively providing control data to effect land line communications, and arranged separately from the central office switching system and the mobile switching center, said network controller being connected to both said mobile switching center and at least one service switching point through at least one service transfer point arranged to convey control data to effect communications, said network controller storing preprogrammed call processing data associated with subscribers who are associated with the communication lines connected to consumer premise terminals connected to the central office switching system and said mobile switching center and who are also associated with a mobile communication unit, said network controller having additional storage capacity;

a first adjunct registration device which is portable associated with each of said subscribers, which registration device includes a low power transceiver programmed to respond to receipt of a predetermined wireless signal and transmit an identifying signal;

a second adjunct registration device associated with a consumer premise terminal located at a site where multiple persons gather, said second adjunct registration device including a low power transceiver programmed to periodically transmit a predetermined wireless signal associated with at least one of said first adjunct registration devices to cause said first registration device transceiver to respond and transmit its identity signal, said second adjunct registration device responsive to receiving said response causing the conveyance of a signal to at least one of said service switching points, whereby said service switching point originates a signal to said network controller to cause storage of registration of the subscriber identified by said identification signal.

2. A registration system according to claim 1 wherein said conveyed signal is a data signal between the site of said terminal and said second adjunct registration device and said service switching point, said signal being conveyed without requiring connection of said terminal and its associated communication line to a central office switch.

3. A registration system according to claim 2 wherein said data signal is conveyed at least partially over the data channel of an ISDN link.

4. A registration system according to claim 1 wherein said second adjunct registration device includes storage means and is programmed to react to receipt of the responsive signal from the first adjunct registration device by storing an identity signified by said response signal.

5. A registration system according to claim 4 wherein said second adjunct registration device is programmed to react to receipt of the responsive signal from said first adjunct registration device by causing said terminal to go off hook and then initiating a signal to said service control point to cause registration in said storage associated with said network controller of the identified subscriber as located at said terminal associated with said second adjunct registration device whereby calls to the personal directory number of said subscriber are directed to said terminal identified by said registration in said storage associated with said network controller.

6. A registration system according to claim 5 wherein said second adjunct registration device includes means for determining the continued presence of said subscriber corresponding to said identity stored in said storage of said second adjunct device, and means for removing said storage of said identity following discontinuance of said presence.

7. A registration system according to claim 6 wherein said second adjunct registration device includes means for causing deregistration of said subscriber in said storage associated with said network controller in conjunction with removal of said storage of said identity from said storage of said second adjunct device following discontinuance of said presence.

8. A registration system according to claim 1 wherein said signal to said service switching point is conveyed by common channel interoffice signaling.

9. A registration system according to claim 8 wherein said signal to said network controller comprises a TCAP message and said network controller comprises an integrated service control point.

10. In a registration system for routing a call to a subscriber to a personal telephone number service in an integrated wired and wireless communications network, comprising:

a central office switching system connected to communication lines connected to subscriber premise terminals including at least one service switching point for selectively providing switched communications between the communication lines;

a mobile switching center connected to the central office switching system arranged for selectively providing wireless communications between said central office switching system and wireless mobile communications units by using control data conveyed to at least one service switching point through a service transfer point;

a network controller arranged for selectively providing control data to effect land line communications, and arranged separately from the central office switching system and the mobile switching center, said network controller being connected to both said mobile switching center and at least one service switching point through at least one service transfer point arranged to convey control data to effect communications, said network controller storing preprogrammed call processing data associated with subscribers who are associated with the communication lines connected to consumer premise terminals connected to the central office switching system and said mobile switching center and who are also associated a mobile communication unit, said network controller having additional storage capacity, a method comprising the steps of:

actuating a registration device for registering personal number service subscribers at a gathering site for multiple persons, which gathering site has a telephone terminal connected to said central office switching system;

responsive to said actuation conveying a signal to at least one of said service switching points, said signal containing information identifying a single number service subscriber present at said gathering site;

generating a signal at said service switching point and conveying said signal to said network controller;

responsive to receipt of said signal at said network controller storing data in storage associated with the network controller to indicate registration of the subscriber identified in said signal to said service switching point whereby calls to said subscriber are routed to said telephone terminal at said site.

11. A method according to claim 10 wherein said conveyed signal is a data signal between said site and said service switching point which is conveyed without requiring connection of said terminal to a central office switch.

12. A method according to claim 11 including the step of conveying said data signal at least partially over the data channel of an ISDN link.

13. A method according to claim 10 including the step of momentarily going off hook with said terminal and during the off hook period initiating said signal to said service control point to cause registration of said subscriber as located at said terminal, whereby calls to the personal number of said subscriber are directed to said terminal identified by said registration in said storage.

14. A method according to claim 10 including the step of registering in storage at said site the identity of the subscriber registered in said storage associated with said network controller.

15. A method according to claims 14 including the steps of deregistering the identity of said subscriber in said storage at said site and deregistering the identity of said subscriber in said storage associated with said network controller upon the occurrence of a predetermined event.

16. In a registration system for routing a call to a subscriber to a personal telephone number service in an integrated wired and wireless communications network, comprising:

a central office switching system connected to communication lines connected to subscriber premise terminals including at least one service switching point for selectively providing switched communications between the communication lines;

a mobile switching center connected to the central office switching system arranged for selectively providing wireless communications between said central office switching system and wireless mobile communications units by using control data conveyed to at least one service switching point through a service transfer point;

a network controller arranged for selectively providing control data to effect land line communications, and arranged separately from the central office switching system and the mobile switching center, said network controller being connected to both said mobile switching center and at least one service switching point through at least one service transfer point arranged to convey control data to effect communications, said network controller storing preprogrammed call processing data associated with subscribers who are associated with the communication lines connected to consumer premise terminals connected to the central office switching system and said mobile switching center and who are also associated a mobile communication unit, said network controller having additional storage capacity, a method comprising the steps of:

periodically transmitting from a gathering site for multiple persons, which site includes a telephone terminal connected to said central office switching system, a wireless signal associated with said terminal;

detecting said transmitted signal with a portable registration device;

responsive to said detection transmitting from said portable registration device a wireless signal acknowledging receipt of said first transmitted wireless signal and transmitting a signal identifying the responding portable registration device;

detecting said response from said portable registration device at the source of said first transmission and responsive to detecting said response conveying a signal to at least one of said service switching points;

originating a signal at said service switching point responsive to said signal conveyed thereto and conveying said signal originated at said service switching point to said network controller;

deriving information from said signal received at said network controller including the identity of said responding portable registration device, and storing in the storage of said network controller data to indicate registration of the subscriber associated with the portable registration device at the terminal at which said signal to said service switching point originated as being located at said terminal; and directing calls to said subscriber at said terminal at said site.

17. A method according to claim 16 wherein said signal is conveyed to said service control point as a data signal which is conveyed without requiring connection of said terminal to a central office switch.

18. A method according to claim 17 wherein said data signal is conveyed at least partially over the data channel of an ISDN link.

19. A method according to claim 16 including the steps of, responsive to the detection of the response from said portable registration device, momentarily going off hook at said terminal, and during the off hook interval initiating said signal to said service control point.

20. A method according to claim 16 including the step of registering in storage at said site the identity of the subscriber registered in said storage associated with said network controller.

21. A method according to claim 16 including the steps of deregistering the identity of said subscriber in said storage at said site and deregistering the identity of said subscriber in said storage associated with said network controller following lack of response by the previously identified portable registration device.

22. A method according to claim 16 including the step of deregistering the identity of said subscriber in said storage associated with said network controller following lack of response by the previously identified portable registration device.

23. A method according to claim 16 including the steps of completing a call directed to said subscriber at said terminal at said site by transmitting from said site a wireless signal including information identifying the calling number, actuating a display carried by said subscriber and activating a notification signal associated with said display to alert the subscriber to the call.

24. A method according to claim 20 including the step of said subscriber initiating dialing of the displayed number and effecting connection to the terminal associated therewith.

25. A method according to claim 24 including the step of effecting said connection via a wired terminal at said site.

26. A method according to claim 24 including the step of effecting said connection via the mobile communication unit of said subscriber.

* * * * *